United States Patent
He

(10) Patent No.: US 12,393,206 B2
(45) Date of Patent: Aug. 19, 2025

(54) MAP CREATING METHOD AND APPARATUS FOR AUTONOMOUS ROBOT, DEVICE, AND STORAGE MEDIUM

(71) Applicant: Positec Power Tools (Suzhou) Co., Ltd., Suzhou (CN)

(72) Inventor: Mingming He, Suzhou (CN)

(73) Assignee: Positec Power Tools (Suzhou) Co., Ltd. (CN)

(*) Notice: Subject to any disclaimer, the term of this patent is extended or adjusted under 35 U.S.C. 154(b) by 183 days.

(21) Appl. No.: 17/790,695

(22) PCT Filed: Nov. 11, 2020

(86) PCT No.: PCT/CN2020/128027
§ 371 (c)(1),
(2) Date: Nov. 1, 2022

(87) PCT Pub. No.: WO2021/135658
PCT Pub. Date: Jul. 8, 2021

(65) Prior Publication Data
US 2024/0192704 A1    Jun. 13, 2024

(30) Foreign Application Priority Data
Jan. 2, 2020   (CN) .................... 202010002699.0

(51) Int. Cl.
*G05D 1/648* (2024.01)

(52) U.S. Cl.
CPC .................. *G05D 1/6484* (2024.01)

(58) Field of Classification Search
CPC .. G05D 1/6484; G05D 1/0274; G05D 1/0242; G05D 1/0214; G05D 1/0246; G05D 1/0257; G05D 1/0263; G05D 1/0285
See application file for complete search history.

(56) References Cited

U.S. PATENT DOCUMENTS

| 9,411,338 B2 | 8/2016 | Hanaoka et al. |
| 10,691,958 B1 * | 6/2020 | Fink .................... G06V 20/54 |

(Continued)

FOREIGN PATENT DOCUMENTS

| CN | 104345734 A | 2/2015 |
| CN | 104457772 A | 3/2015 |

(Continued)

OTHER PUBLICATIONS

The Chinese Office Action mailed Apr. 28, 2022, for Chinese patent application No. CN202010002699.0, 9 pages.

(Continued)

*Primary Examiner* — Sohana Tanju Khayer
(74) *Attorney, Agent, or Firm* — Lee & Hayes, P.C.

(57) ABSTRACT

Embodiments of this specification provide a map creating method and apparatus for an autonomous robot, a device, and a storage medium. The map creating method for an autonomous robot includes: acquiring an initial map selected from a target database, wherein the initial map includes an initial boundary; causing the autonomous robot to perform boundary detection to acquire a measured boundary, wherein positioning precision of the autonomous robot satisfies a preset condition; and correcting the initial boundary according to the measured boundary.

17 Claims, 6 Drawing Sheets

(56) References Cited

U.S. PATENT DOCUMENTS

| | | | |
|---|---|---|---|
| 11,274,929 B1* | 3/2022 | Afrouzi | G06T 7/62 |
| 2001/0022506 A1* | 9/2001 | Peless | G05D 1/0263 |
| | | | 318/580 |
| 2002/0140393 A1 | 10/2002 | Peless et al. | |
| 2007/0293985 A1* | 12/2007 | Myeong | G05D 1/0274 |
| | | | 700/245 |
| 2014/0316635 A1* | 10/2014 | Bando | G05D 1/0274 |
| | | | 701/25 |
| 2018/0232134 A1* | 8/2018 | Ebrahimi Afrouzi | |
| | | | B25J 9/1666 |
| 2018/0273031 A1* | 9/2018 | Fujita | G01C 21/30 |
| 2018/0357728 A1* | 12/2018 | Huening | H04L 67/535 |
| 2018/0373263 A1* | 12/2018 | Gray | G06V 20/58 |
| 2019/0196497 A1* | 6/2019 | Eoh | G05D 1/0274 |
| 2020/0050205 A1* | 2/2020 | McClelland | G01C 21/20 |
| 2021/0003405 A1* | 1/2021 | Choi | G01C 21/3837 |
| 2021/0018929 A1* | 1/2021 | Choi | G05D 1/0212 |
| 2021/0046925 A1* | 2/2021 | Bonkoski | B60W 30/09 |
| 2021/0089040 A1* | 3/2021 | Ebrahimi Afrouzi | |
| | | | G05D 1/0248 |
| 2021/0100160 A1* | 4/2021 | Kang | G05D 1/0219 |
| 2021/0138657 A1* | 5/2021 | Cui | B25J 9/1697 |
| 2021/0139047 A1* | 5/2021 | Geldner | B60W 40/08 |
| 2021/0165409 A1* | 6/2021 | Berntorp | G05D 1/0214 |
| 2021/0247775 A1* | 8/2021 | Cen | G05B 19/042 |
| 2022/0022718 A1* | 1/2022 | Wu | A47L 9/0063 |
| 2022/0232194 A1* | 7/2022 | Sugata | G01C 21/3811 |
| 2022/0238029 A1* | 7/2022 | Li | G08G 5/0021 |
| 2022/0264793 A1* | 8/2022 | Kangro | G05D 1/0219 |
| 2022/0317689 A1* | 10/2022 | Li | B60L 53/67 |

FOREIGN PATENT DOCUMENTS

| | | |
|---|---|---|
| CN | 105652864 A | 6/2016 |
| CN | 105843228 A | 8/2016 |
| CN | 106530946 A | 3/2017 |
| CN | 107239074 A | 10/2017 |
| CN | 108106616 A | 6/2018 |
| CN | 105843228 B | 7/2018 |
| CN | 108908331 A | 11/2018 |
| CN | 109344214 A | 2/2019 |
| CN | 109682368 A | 4/2019 |
| CN | 110567467 A | 12/2019 |
| CN | 111226178 A | 6/2020 |
| DE | 102017218917 A1 | 4/2019 |
| EP | 3018548 A1 | 5/2016 |
| EP | 3474107 A1 | 4/2019 |
| EP | 3701340 A1 | 9/2020 |
| EP | 3167700 B1 | 8/2021 |
| KR | 10-2020-0079489 A | 7/2020 |
| WO | 2017167207 A1 | 10/2017 |
| WO | 2019081135 A1 | 5/2019 |

OTHER PUBLICATIONS

The Second Chinese Search Report mailed Mar. 9, 2023, for Chinese Patent Application No. CN202010002699.0, 1 pages.

The Chinese Search Report mailed Apr. 28, 2022, for Chinese Patent Application No. CN202010002699.0, 1 page.

The Third Party Observations Report mailed Mar. 27, 2024 for European Patent Application No. EP20908702.2, 4 pages.

The Supplementary European Search Report mailed Aug. 16, 2023, for European Patent Application No. EP20908702.2, 2 pages.

The Extended European Search Report mailed Aug. 16, 2023, for European Patent Application No. EP20908702.2, 4 pages.

PCT Search Report mailed Jan. 27, 2021 for PCT Application No. PCT/CN2020/128027, 3 Pages.

PCT Written Opinion mailed Jan. 27, 2021, for PCT Application No. PCT/CN2020/128027, 4 Pages.

* cited by examiner

MAP CREATING METHOD AND APPARATUS FOR AUTONOMOUS ROBOT, DEVICE, AND STORAGE MEDIUM

CROSS-REFERENCE TO RELATED APPLICATION

This application is a National Stage Application of International Application No. PCT/CN2020/128027, filed on Nov. 11, 2020, which claims benefit of and priority to Chinese Patent Application No. 202010002699.0, filed on Jan. 2, 2020, all of which are hereby incorporated by reference in their entirety for all purposes as if fully set forth herein.

TECHNICAL FIELD

This specification relates to the technical field of autonomous robots, and in particular, to a map creating method and apparatus for an autonomous robot, a device, and a storage medium.

BACKGROUND

A map is generally required to be created for an autonomous robot in advance (referred to as map creating for short below), so that the autonomous robot can move and perform a task based on the map. At present, for map creating of some autonomous robots, a user operates a drawing device with a positioning function at a detection site to traverse a boundary of an operation area, to delineate the operation area, and then manually draws an obstacle distribution on this basis.

In addition, some users also attempt to use commercial map software such as Google Earth to manually delineate the operation area and the obstacle distribution.

SUMMARY

Embodiments of this specification are intended to provide a map creating method and apparatus for an autonomous robot, a device, and a storage medium, so as to improve map creating precision and map creating efficiency of the autonomous robot.

In order to achieve the above objective, in one aspect, an embodiment of this specification provides a map creating method for an autonomous robot, including the following:
acquiring an initial map selected from a target database, wherein the initial map comprises an initial boundary;
causing the autonomous robot to perform boundary detection to acquire a measured boundary, wherein positioning precision of the autonomous robot satisfies a preset condition; and
correcting the initial boundary according to the measured boundary;
wherein the acquiring an initial map selected from a target database comprises: sending, to a server, a plot selection request carrying plot identification information; and
receiving a plot selection response carrying a plot map, and using the plot map as the initial map, wherein the plot map is obtained by matching from a plot database by the server according to the plot identification information; wherein the plot identification information comprises any of the following: an identifier of a plot; or a location address corresponding to the plot;
wherein the causing the autonomous robot to perform boundary detection comprises: determining, according to detection data collected by a boundary detection apparatus of the autonomous robot, whether a boundary point is detected; recording a heading angle of the autonomous robot and first coordinates outputted by a positioning apparatus of the autonomous robot at this time when the boundary point is detected; determining second coordinates of the boundary point according to the first coordinates, the heading angle, a distance between the positioning apparatus and the boundary detection apparatus, and the detection data; and
forming the measured boundary according to second coordinates of each detected boundary point; wherein the boundary detection apparatus comprises a visual sensor;
wherein causing the autonomous robot to maintain a preset safe distance from the initial boundary in the process of causing the autonomous robot to perform the boundary detection; wherein the causing the autonomous robot to maintain a preset safe distance from the initial boundary comprises: causing the autonomous robot to maintain a first safe distance from a dangerous boundary segment in the initial boundary; and
causing the autonomous robot to maintain a second safe distance from a non-dangerous boundary segment in the initial boundary, wherein the second safe distance is less than the first safe distance;
wherein the determining, in the process of causing the autonomous robot to perform the boundary detection, whether a to-be-detected boundary segment is the dangerous boundary segment; determining whether a detection site is equipped with manual monitoring when the to-be-detected boundary segment is the dangerous boundary segment; and causing the autonomous robot to start or continue the boundary detection when it is determined that the detection site is equipped with the manual monitoring; stopping the autonomous robot when it is determined that the detection site is not equipped with the manual monitoring; and
causing the autonomous robot to start or continue the boundary detection when the to-be-detected boundary segment is a non-dangerous boundary segment;
wherein the determining whether a detection site is equipped with manual monitoring comprises any one or more of the following:
determining, depending on whether a wireless communication module of the autonomous robot receives a wireless signal transmitted by a specified device, whether the detection site is equipped with the manual monitoring, wherein the specified device is carried by on-site monitoring personnel; or
determining, depending on whether an imaging detector of the autonomous robot detects a human body signal within a specified detection radius, whether the detection site is equipped with the manual monitoring;
wherein the correcting the initial boundary according to the measured boundary comprises: replacing the initial boundary with the measured boundary.

In another aspect, an embodiment of this specification further provides a map creating apparatus for an autonomous robot, including the following:
an initial boundary acquisition module, configured to acquire an initial map selected from a target database, wherein the initial map comprises an initial boundary;
a measured boundary acquisition module, configured to cause the autonomous robot to perform boundary detection to acquire a measured boundary, wherein positioning precision of the autonomous robot satisfies a preset condition; and an initial boundary correction module, configured to correct the initial boundary according to the measured boundary.

In another aspect, an embodiment of this specification further provides an autonomous robot. The autonomous robot is configured with the foregoing map creating apparatus.

In another aspect, an embodiment of this specification further provides a computer storage medium, storing a computer program thereon. The computer program, when executed by a processor, performs the foregoing map creating method.

It can be seen from the technical solution provided in the above embodiments of this specification that, in the embodiments of this specification, after an initial map selected from a target database is acquired, the autonomous robot may be caused to perform boundary detection to acquire a measured boundary. Since positioning precision of the autonomous robot satisfies a preset condition, the measured boundary has higher precision than the initial boundary. When the initial boundary is corrected according to the measured boundary, the obtained operation area map has higher precision. Moreover, in the embodiments of this specification, the initial map selected from the target database may be directly acquired, and the initial boundary may be automatically optimized according to the initial map. Therefore, the map creating efficiency of the autonomous robot is also enhanced.

BRIEF DESCRIPTION OF THE DRAWINGS

To describe the technical solutions in the embodiments of this specification or in the prior art more clearly, the following briefly introduces the accompanying drawings required for describing the embodiments or the prior art. Apparently, the accompanying drawings in the following descriptions show merely some embodiments of this specification, and a person of ordinary skill in the art may still derive other accompanying drawings from these accompanying drawings without creative efforts.

DETAILED DESCRIPTION

To enable a person skilled in the art to better understand the technical solutions in this specification, the technical solutions of the embodiments of this specification are described clearly and thoroughly below with reference to the accompanying drawings of the embodiments of this specification. Apparently, the described embodiments are merely some rather than all of the embodiments of this specification. All other embodiments obtained by a person of ordinary skill in the art based on the embodiments of this specification without creative efforts shall fall within the protection scope of this specification.

Figure 1:
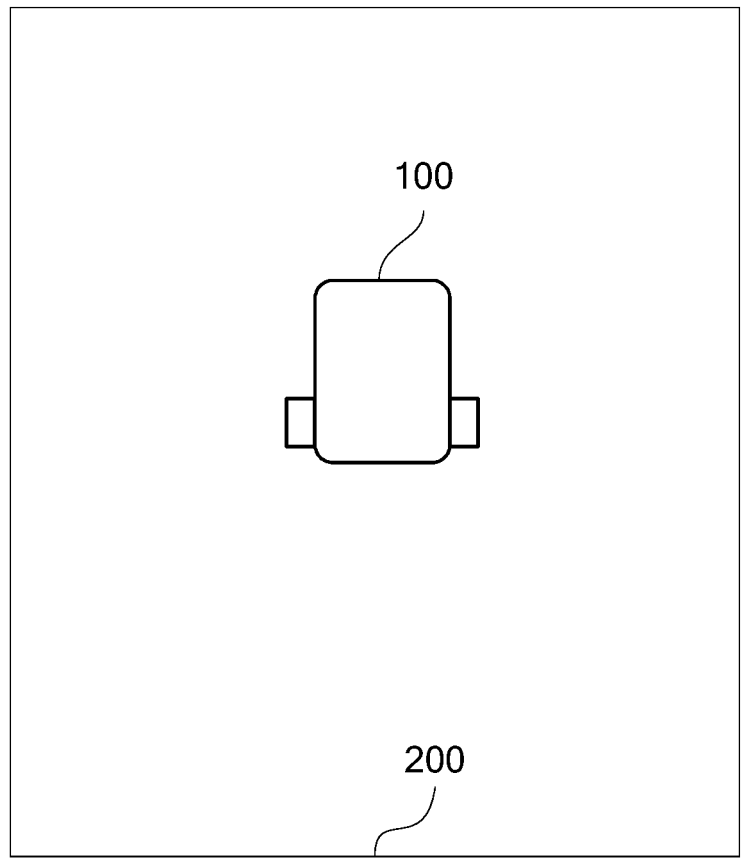
FIG. 1 is a schematic diagram of an autonomous robot according to some embodiments of this specification.

Referring to FIG. 1, an autonomous robot 100 (or referred to as a self-moving robot) of some embodiments of this specification is a robot whose body is equipped with various necessary sensors and control apparatuses and that can independently complete a certain task without input and control of external human information during operation. That is to say, the autonomous robot 100 may autonomously move within an operation area 200 and perform a task. For example, in some exemplary embodiments of this specification, the autonomous robot 100 may include an intelligent lawn mower, an automatic cleaning device, an automatic watering device, an automatic snowplow, or the like.

Figure 2:
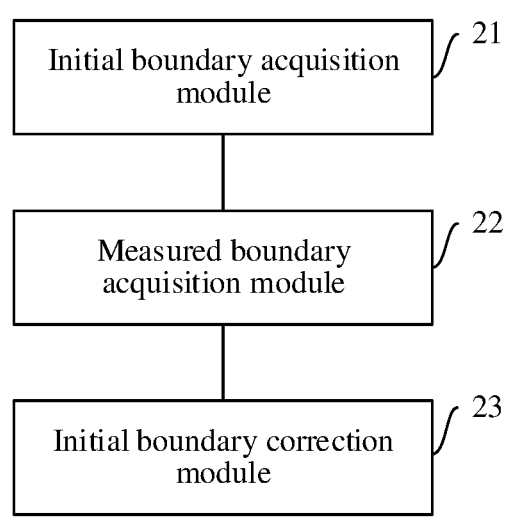
FIG. 2 is a structural block diagram of an autonomous robot according to some embodiments of this specification.

The autonomous robot of the embodiments of this specification may be configured with a map creating apparatus. The map creating apparatus is intended to improve map creating precision and map creating efficiency of the autonomous robot. With reference to FIG. 2, in some embodiments of this specification, the map creating apparatus may include an initial boundary acquisition module 21, a measured boundary acquisition module 22, and an initial boundary correction module 23. The initial boundary acquisition module 21 may be configured to acquire an initial map selected from a target database. The initial map includes an initial boundary. The measured boundary acquisition module 22 may be configured to cause the autonomous robot to perform boundary detection to acquire a measured boundary. Positioning precision of the autonomous robot satisfies a preset condition. The initial boundary correction module 23 may be configured to correct the initial boundary according to the measured boundary.

It can be seen that, in the foregoing embodiments of this specification, by directly acquiring the initial map selected from the target database, the map creating apparatus may cause the autonomous robot to perform boundary detection to acquire the measured boundary. Since positioning precision of the autonomous robot satisfies a preset condition, the measured boundary has higher precision than the initial boundary. When the initial boundary is corrected according to the measured boundary, the obtained operation area map has higher precision. Moreover, the map creating apparatus may directly acquire the initial map selected from the target database, and may automatically optimize the initial boundary according to the initial map. Therefore, the map creating efficiency of the autonomous robot is also enhanced, and user experience is improved.

In some embodiments of this specification, the target database may be a plot database (or referred to as a plot set).

The initial boundary acquisition module 21 may acquire, in any suitable manner, the initial map selected from the target database, so as to reduce labor intensity of the user and improve the map creating efficiency. Initial maps of a plurality of plots are pre-saved in the plot database for the user to select. The initial map of each plot in the plot database may be generated by a manufacturer of the autonomous robot (or other parties such as a service provider) based on a geographic information system (GIS) of an administrative organization (for example, a land resource database) or an electronic map of an enterprise or other organizations (for example, Google Earth, Baidu Map, or Google Map). Generally, in view of demands, costs, and the like, the map precision of the GIS and the electronic map is for civil use, so that the precision of the initial map obtained by the initial boundary acquisition module 21 is generally not high.

Figure 3:
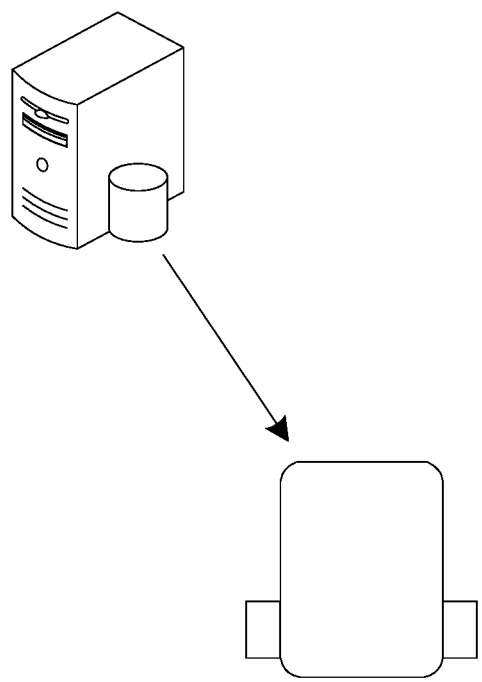
FIG. 3 is a schematic diagram of selecting an operation area according to some embodiments of this specification.

In some embodiments of this specification, the autonomous robot may communicate with a server. For example, as shown in FIG. 3, the initial boundary acquisition module 21 of the autonomous robot may send, to the server, a plot selection request carrying plot identification information, receive a plot selection response carrying a plot map, and use the plot map as an initial map. The plot map may be obtained by matching from the plot database by the server according to the plot identification information. The plot identification information may be, for example, an identifier of a plot, a location address corresponding to the plot, or the like. Before the plot selection request is initiated, the initial boundary acquisition module 21 may obtain the plot identification information based on an input operation by the user. For example, in an exemplary embodiment, the identifier of the plot may be a string (for example, Sudi 2019-WG-8) configured to uniquely identify a plot map. In another example, in another exemplary embodiment, the location address corresponding to the plot may be a communication address of the plot.

Figure 4:
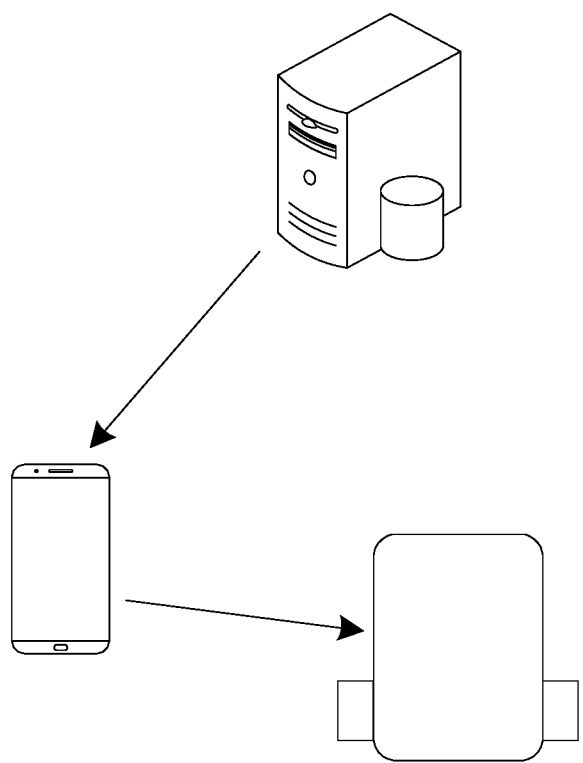
FIG. 4 is a schematic diagram of selecting an operation area according to some other embodiments of this specification.

In some other embodiments of this specification, the autonomous robot may communicate with a third party. For example, the autonomous robot may receive an initial map sent by the third party. The initial map may be selected from the plot database by the third party. As shown in FIG. 4, the third party may initiate, to the server, a plot selection request carrying plot identification information based on the input operation by the user. The server may match the corresponding plot map from the plot database according to the plot identification information, and return the plot map to the third party. The third party may provide the plot map to the autonomous robot. Correspondingly, the initial boundary acquisition module 21 of the autonomous robot may use the obtained plot map as an initial map.

In some other embodiments of this specification, the target database may alternatively be an electronic map database (referred to as an electronic map for short below). Correspondingly, the third party may form the plot map selected by the user based on an area selection operation by the user on the electronic map (such as Google Earth, Baidu Map, Google Map, and the like), and send the formed plot map to the autonomous robot. Correspondingly, the initial boundary acquisition module 21 of the autonomous robot may use the received plot map as the initial map. The area selection operation may be, for example, using, as an initial map, an area delineated on the electronic map displayed by the third party by the user by using a finger, a mouse, a keyboard, or the like.

In some embodiments of this specification, the foregoing third party may be a desktop computer, a tablet computer, a notebook computer, a smart phone, a digital assistant, an intelligent wearable device, or the like. The intelligent wearable device may include an intelligent bracelet, an intelligent watch, intelligent glasses, an intelligent helmet, and the like. Certainly, the third party may not be limited to the foregoing electronic device having a certain entity, which may further be software running in the foregoing electronic device.

In some embodiments of this specification, the server may be an electronic device having operation and network interaction functions, or may be software running in the electronic device and configured to provide business logic for data processing and network interaction.

In some embodiments of this specification, communication between the third party and the server, between the autonomous robot and the server, and between the third party and the autonomous robot may be performed in a wired or wireless manner, and the like, thereby realizing data exchange. For example, in a typical application scenario, when the third party is the smart phone, the third party may communicate with the server via a mobile communication network, and may communicate with the autonomous robot through Bluetooth and other methods.

In some embodiments of this specification, the positioning precision of the autonomous robot satisfying the preset condition may mean that the positioning apparatus of the autonomous robot has relatively high positioning precision to meet a requirement for high-precision positioning. In some embodiments, the positioning precision of the positioning apparatus of the autonomous robot may reach, for example, a decimeter level, a centimeter level, or even higher. For example, in an exemplary embodiment, the positioning apparatus of the autonomous robot may be a differential positioning apparatus based on a differential positioning technology (for example, a real-time kinematic (RTK) carrier phase differential technology).

Figure 5:
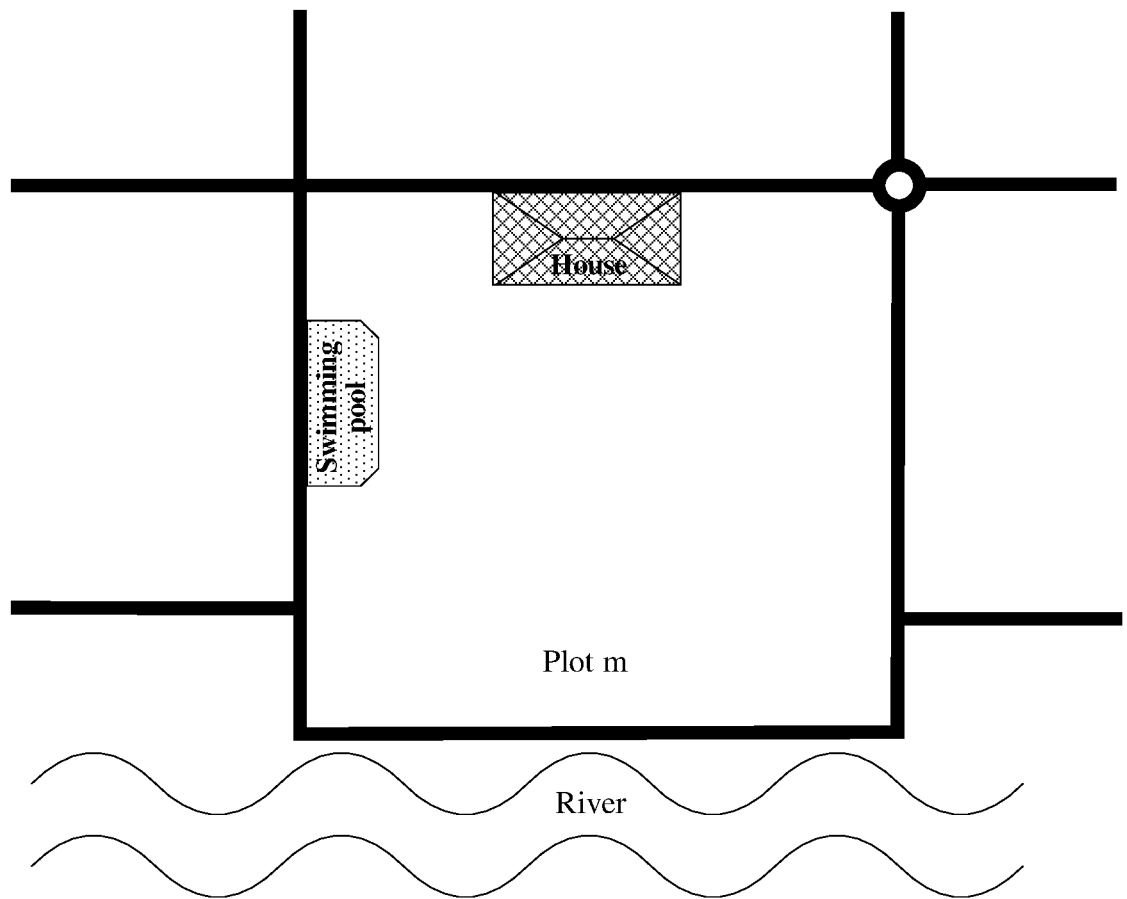
FIG. 5 is a schematic diagram of an initial map of an operation area according to an embodiment of this specification.

In some embodiments of this specification, the initial map of the operation area is generally a plane map. The plane map shows the initial boundary (that is, an outline) of the operation area, the obstacle distribution within and around the operation area, and the like. Certainly, the initial map is further configured with coordinate information of each position point. For example, in the exemplary embodiment shown in FIG. 5, a plot m is an approximately rectangular plot divided by a plurality of roads, in which obstacles such as a house and a swimming pool are distributed, and a south side of the plot m is adjacent to a river.

Figure 6:
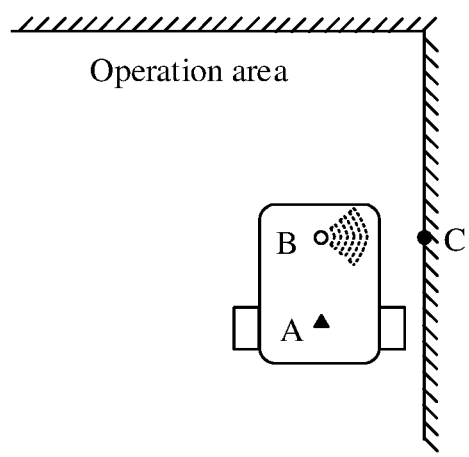
FIG. 6 is a schematic diagram of boundary detection performed on an autonomous robot according to some embodiments of this specification.

It has been clarified above that the initial map of each plot in the plot database has limited precision. Therefore, in order to improve the map creating precision of the autonomous robot, it is necessary to perform boundary detection on the initial boundary to optimize the initial boundary according to the measured boundary. In some embodiments of this specification, based on data provided by a boundary detection apparatus (such as a white circle mark in FIG. 6), a positioning apparatus (such as a black triangle mark in FIG. 6) configured for the autonomous robot, and the like, the measured boundary acquisition module 22 may cause the autonomous robot to perform boundary detection along the initial boundary of the operation area (as shown in FIG. 6) to acquire the measured boundary. In some embodiments, the boundary detection apparatus may include, but is not limited to, one or more of a visual sensor, a multispectral sensor, a capacitive proximity sensor, or a radar sensor. In order to cause the autonomous robot to be applicable to the boundary detection in various operating conditions, the visual sensor (or a combination of the visual sensor and other boundary sensors) is a better choice.

For ease of understanding, the boundary detection process of the measured boundary acquisition module 22 is described below by using the autonomous robot performing the boundary detection along the initial boundary as an example. However, those skilled in the art can understand that the autonomous robot may also perform the boundary detection in any other suitable manner without departing from the spirit and principle of this specification. It should be noted that, the expression "along the initial boundary" in this specification may mean that the autonomous robot moves close to the initial boundary in the operation area, and an overall trend of a movement trajectory of the autonomous robot is along the initial boundary. In addition, the autonomous robot may shut down a job actuator thereof during the boundary detection, to improve safety of the boundary detection. For example, an intelligent lawn mower is used as an example. A cutter head may be turned off during the boundary detection.

In some embodiments of this specification, the measured boundary acquisition module 22 may determine, according to detection data collected by the boundary detection apparatus of the autonomous robot, whether a boundary point is detected. For example, an intelligent lawn mower is used as an example. The operation area of the intelligent lawn mower is usually grass, and a road, a river, a fence, a wall, or the like is generally at an edge of the grass. Therefore, it may be determined, by recognizing an image collected by the visual sensor of the intelligent lawn mower as the boundary detection apparatus, whether the boundary point is detected.

When the boundary point is detected, the measured boundary acquisition module 22 may record a heading angle of the autonomous robot and first coordinates outputted by a positioning apparatus of the autonomous robot at this time, and may determine second coordinates of the boundary point according to the first coordinate, the heading angle, a distance between the positioning apparatus and the boundary detection apparatus, and the detection data. In this way, the measured boundary may be formed according to second coordinates of each detected boundary point.

Figure 7:
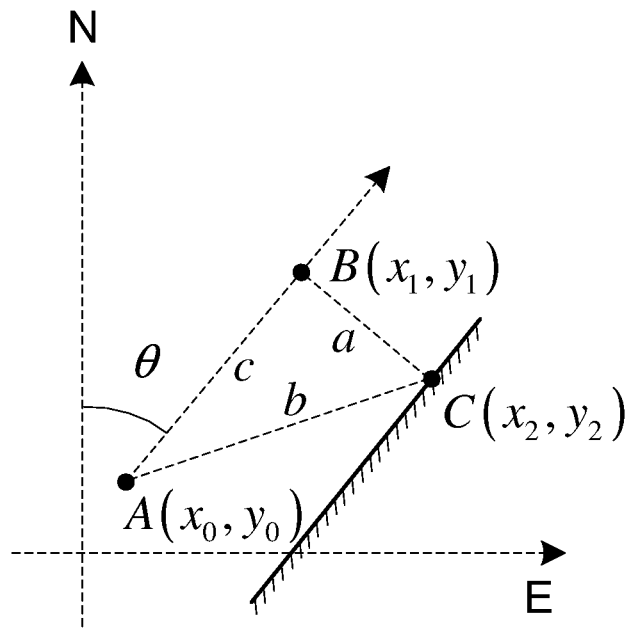
FIG. 7 is a schematic diagram of determining coordinates of a boundary point according to some embodiments of this specification.

For example, in the exemplary embodiment shown in FIG. 7, a point A is a position where the positioning apparatus of the autonomous robot is located, and a point B is a position where the boundary detection apparatus of the autonomous robot is located. The heading of the autonomous robot is shown by a direction of a dotted line with an arrow in FIG. 7. At this time, the recorded heading angle of the autonomous robot is θ, and the recorded coordinates of the point A are $(x_0, y_0)$. Since both the positioning apparatus and the boundary detection apparatus are fixed to the autonomous robot in advance, a distance A–B (that is, a length of c in FIG. 7) is known. Therefore, coordinates of the point B $(x_1, y_1)$ may be calculated according to the heading angle θ and the coordinates $(x_0, y_0)$ of the point A. The boundary detection apparatus of the autonomous robot may measure a distance BC (that is a length of a in FIG. 7) between the boundary detection apparatus and the detected boundary point (that is a point C in FIG. 7). For example, when the boundary detection apparatus is a radar sensor, the distance BC may be measured by using the radar sensor. In another example, when the boundary detection apparatus is a single visual sensor, the distance BC may also be measured based on the principle of monocular vision positioning and ranging. Since ∠ABC is known as a right angle, a distance AC (that is, a length of b in FIG. 7) may be calculated based on ∠ABC, a side length a, and a side length c. In this way, coordinates $(x_2, y_2)$ of the point C may be calculated according to the following formulas:

$$x_2 = x_0 + b\cos\left(\tan^{-1}\frac{y_1 - y_0}{x_1 - x_0} - \cos^{-1}\left(\frac{b^2 + c^2 - a^2}{2bc}\right)\right)$$

$$y_2 = y_0 + b\sin\left(\tan^{-1}\frac{y_1 - y_0}{x_1 - x_0} - \cos^{-1}\left(\frac{b^2 + c^2 - a^2}{2bc}\right)\right)$$

In this way, the second coordinates of each detected boundary point may be obtained by using the above method, and then the measured boundary may be formed according to the second coordinates of these boundary points.

Figure 9:
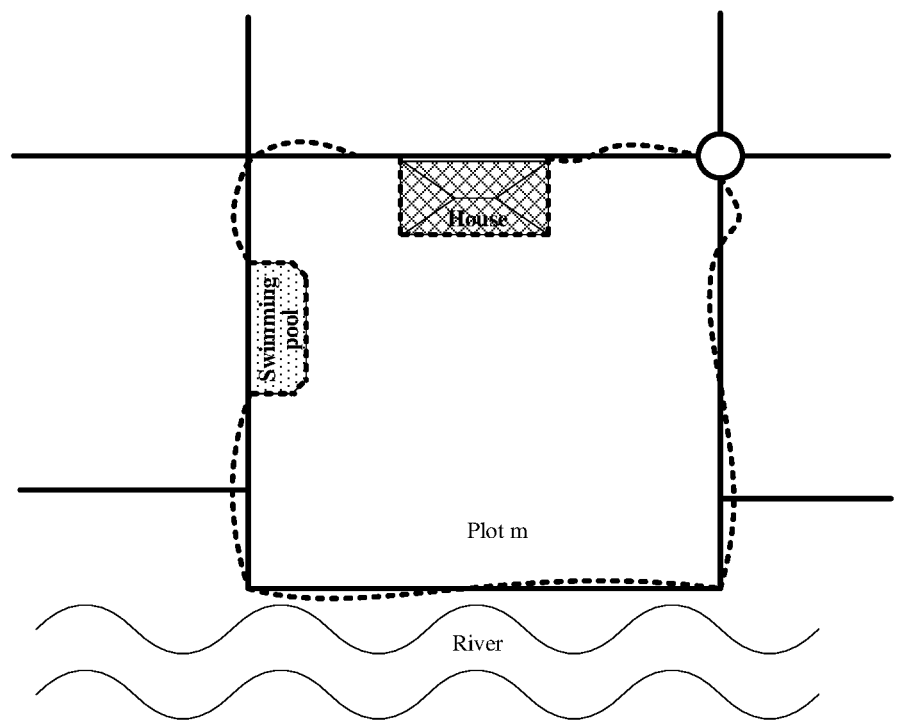
FIG. 9 is a schematic diagram of correcting an initial boundary according to a measured boundary in some embodiments of this specification.
Figure 10:
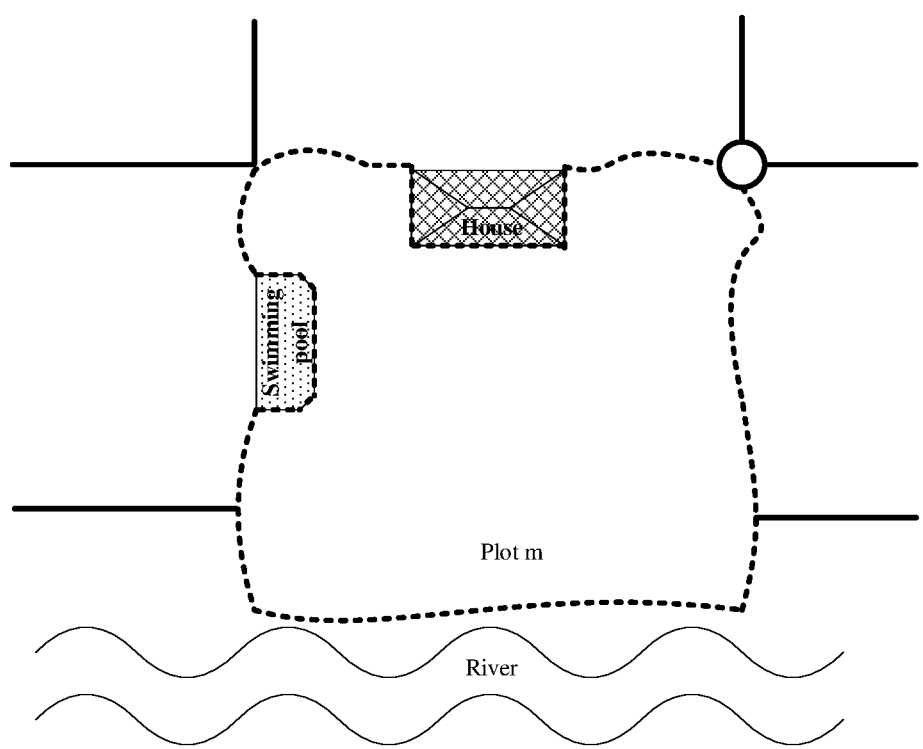
FIG. 10 is a schematic diagram of a map of a corrected operation area according to some embodiments of this specification.

In this way, the initial boundary correction module 23 may correct the initial boundary according to the measured boundary. That is to say, the initial boundary correction module 23 may replace the initial boundary with the measured boundary. Therefore, optimization of the initial map of the operation area is realized, that is, a more precise operation map is obtained. For example, in the exemplary embodiment shown in FIG. 9, the autonomous robot performs the boundary detection along the initial boundary (refer to a rectangle shown by a thick solid line in FIG. 9) of the operation area (that is, a plot m), so that the measured boundary defined by a dotted line in FIG. 9 is obtained. With reference to FIG. 10, a more precise operation area boundary may be obtained by replacing the initial boundary with the measured boundary (refer to a closed boundary defined by a thick dotted line in FIG. 10).

In order to ensure the operation safety of the autonomous robot, in the process of causing the autonomous robot to perform the boundary detection along the initial boundary, the measured boundary acquisition module 22 may further cause the autonomous robot to maintain a preset safe distance from the initial boundary.

Figure 8:
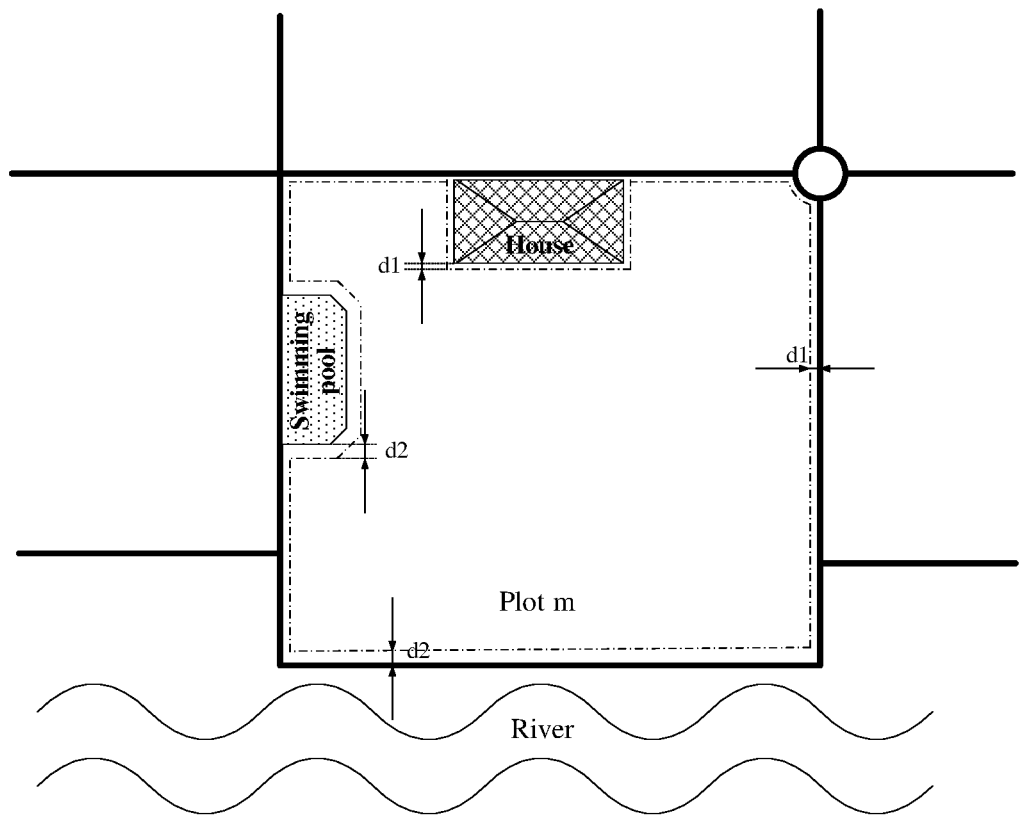
FIG. 8 is a schematic diagram of setting a safe distance in an operation area according to an embodiment of this specification.

In some cases, part or all of the boundaries of the operation area may be a dangerous area such as a road, a river channel, a swimming pool, a cliff, or the like. In order to prevent the autonomous robot from entering the dangerous area, in a process of causing the autonomous robot to perform the boundary detection along the initial boundary, the measured boundary acquisition module 22 may cause the autonomous robot to maintain a slightly larger safe distance (for example, 30% larger than a default safe distance) from a dangerous boundary segment in the initial boundary, for example, as shown by d2 in FIG. 8. The dangerous boundary segment may be defined as a boundary segment adjacent to the dangerous area in the initial boundary.

In some other cases, part or all of the boundaries of the operation area may also be a non-dangerous area such as a fence, a wall, and the like. Therefore, under the premise of ensuring the operation safety of the autonomous robot, in order to take into account the operation coverage of the autonomous robot, for the non-dangerous boundary segment in the initial boundary, in the process of causing the autonomous robot to perform the boundary detection along the initial boundary, the measured boundary acquisition module 22 may cause the autonomous robot to maintain a slightly small safe distance (for example, smaller than a default safe distance) from the non-dangerous boundary segment, for example, as shown by d1 in FIG. 8. The non-dangerous boundary segment may be defined as a boundary segment adjacent to the non-dangerous area in the initial boundary, or a boundary segment not adjacent to the dangerous area in the initial boundary.

In some embodiments of this specification, the dangerous area at the boundary of the operation area may be automatically determined by the measured boundary acquisition module 22 through image recognition, or may be specified by the user, which may be specifically determined as required and is not limited in this specification. The measured boundary acquisition module 22 may automatically set a safe distance for the dangerous area and the non-dangerous area after determining the dangerous area and the non-dangerous area.

In some embodiments of this specification, in order to further improve the safety of the boundary detection, in the process of causing the autonomous robot to perform the boundary detection along the initial boundary, the measured boundary acquisition module 22 may further determine whether a to-be-detected boundary segment is the dangerous boundary segment, so as to facilitate on-site manual monitoring of the dangerous boundary segment. Since the dangerous boundary segment and the non-dangerous boundary segment in the initial boundary have been divided before the boundary detection is performed, based on the division result, the measured boundary acquisition module 22 may determine whether the to-be-detected boundary segment is the dangerous boundary segment.

In some embodiments of this specification, when the to-be-detected boundary segment is the dangerous boundary segment, the measured boundary acquisition module 22 may further determine whether a detection site is equipped with manual monitoring. When it is determined that the detection site is equipped with the manual monitoring, the measured boundary acquisition module 22 may cause the autonomous robot to start or continue the boundary detection. When it is determined that the detection site is not equipped with the manual monitoring, the measured boundary acquisition module 22 stops the autonomous robot, and may further give an alarm, so as to further improve the safety of the boundary detection of the autonomous robot.

In some embodiments of this specification, the measured boundary acquisition module 22 may determine, in any suitable manner, whether the detection site is equipped with the manual monitoring, which is not limited in this specification and may be specifically selected as required. For example, in some embodiments, it may be determined, depending on whether a wireless communication module of the autonomous robot receives a wireless signal transmitted by a specified device, whether the detection site is equipped with the manual monitoring. The specified device is carried by on-site monitoring personnel, and may continuously transmit wireless signals to the outside. Therefore, when the wireless signal transmitted by the specified device is received, it may be inferred that the detection site is equipped with the manual monitoring. The wireless signal may be, for example, Bluetooth, Wi-Fi, or the like. In another example, it may further be determined, depending on whether an imaging detector of the autonomous robot detects a human body signal within a specified detection radius, whether the detection site is equipped with the manual monitoring. The imaging detector may be, for example, an infrared thermal imaging detector, an imaging radar, or the like.

The foregoing specified device may be any portable device having the foregoing function, for example, including but not limited to, a smart phone, a tablet computer, a notebook computer, a digital assistant, an intelligent wearable device, or the like.

For the convenience of description, the above apparatus or module is divided into various units by function for description respectively. Certainly, functions of each unit may be implemented in one or more pieces of software and/or hardware during implementation of this specification.

Figure 11:
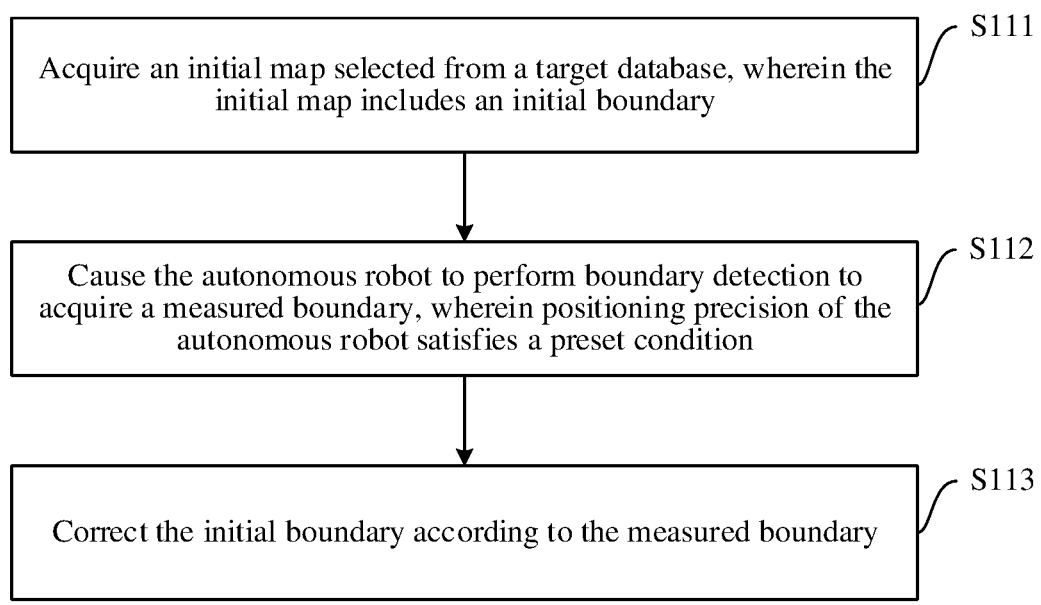
FIG. 11 is a flowchart of a boundary detection method for an autonomous robot according to some embodiments of this specification.

Corresponding to the foregoing map creating apparatus for an autonomous robot, this specification further provides a map creating method for an autonomous robot. Referring to FIG. 11, the map creating method for an autonomous robot according to some embodiments of this specification may include the following steps.

S111: Acquire an initial map selected from a target database, wherein the initial map includes an initial boundary.

S112: Cause the autonomous robot to perform boundary detection to acquire a measured boundary, wherein positioning precision of the autonomous robot satisfies a preset condition.

S113: Correct the initial boundary according to the measured boundary.

In the map creating method for an autonomous robot according to some embodiments of this specification, the acquiring an initial map selected from a target database may include:
  sending, to a server, a plot selection request carrying plot identification information; and
  receiving a plot selection response carrying a plot map, and using the plot map as the initial map, wherein the plot map is obtained by matching from a plot database by the server according to the plot identification information.

In the map creating method for an autonomous robot according to some embodiments of this specification, the plot identification information may include any of the following:
  an identifier of a plot; or
  a location address corresponding to the plot.

In the map creating method for an autonomous robot according to some embodiments of this specification, the acquiring an initial map selected from a target database may include:
  receiving an initial map sent by a third party, wherein the initial map is selected from the plot database by the third party.

In the map creating method for an autonomous robot according to some embodiments of this specification, the acquiring an initial map selected from a target database may further include:
  receiving an initial map sent by a third party, wherein the initial map is selected from an electronic map by the third party.

In the map creating method for an autonomous robot according to some embodiments of this specification, the causing the autonomous robot to perform boundary detection may include:
  determining, according to detection data collected by a boundary detection apparatus of the autonomous robot, whether a boundary point is detected;
  recording a heading angle of the autonomous robot and first coordinates outputted by a positioning apparatus of the autonomous robot at this time when the boundary point is detected;
  determining second coordinates of the boundary point according to the first coordinates, the heading angle, a distance between the positioning apparatus and the boundary detection apparatus, and the detection data; and
  forming the measured boundary according to second coordinates of each detected boundary point.

In the map creating method for an autonomous robot according to some embodiments of this specification, the boundary detection apparatus includes a visual sensor.

The map creating method for an autonomous robot according to some embodiments of this specification may further include:

causing the autonomous robot to maintain a preset safe distance from the initial boundary in the process of causing the autonomous robot to perform the boundary detection.

In the map creating method for an autonomous robot according to some embodiments of this specification, the causing the autonomous robot to maintain a preset safe distance from the initial boundary may include:

causing the autonomous robot to maintain a first safe distance from a dangerous boundary segment in the initial boundary.

In the map creating method for an autonomous robot according to some embodiments of this specification, the causing the autonomous robot to maintain a preset safe distance from the initial boundary may further include:

causing the autonomous robot to maintain a second safe distance from a non-dangerous boundary segment in the initial boundary, where the second safe distance is less than the first safe distance.

The map creating method for an autonomous robot according to some embodiments of this specification may further include:

determining, in the process of causing the autonomous robot to perform the boundary detection, whether a to-be-detected boundary segment is the dangerous boundary segment;
  determining whether a detection site is equipped with manual monitoring when the to-be-detected boundary segment is the dangerous boundary segment; and
  causing the autonomous robot to start or continue the boundary detection when it is determined that the detection site is equipped with the manual monitoring.

The map creating method for an autonomous robot according to some embodiments of this specification may further include:

stopping the autonomous robot when it is determined that the detection site is not equipped with the manual monitoring.

The map creating method for an autonomous robot according to some embodiments of this specification may further include:

causing the autonomous robot to start or continue the boundary detection when the to-be-detected boundary segment is a non-dangerous boundary segment.

In the map creating method for an autonomous robot according to some embodiments of this specification, the determining whether a detection site is equipped with manual monitoring may include any one or more of the following:

determining, depending on whether a wireless communication module of the autonomous robot receives a wireless signal transmitted by a specified device, whether the detection site is equipped with the manual monitoring, wherein the specified device is carried by on-site monitoring personnel; or
  determining, depending on whether an imaging detector of the autonomous robot detects a human body signal within a specified detection radius, whether the detection site is equipped with the manual monitoring.

In the map creating method for an autonomous robot according to some embodiments of this specification, the correcting the initial boundary according to the measured boundary may include:

replacing the initial boundary with the measured boundary.

Although the process flow described above includes a plurality of operations in a particular order, it should be clearly understood that these processes may include more or fewer operations. These operations may be performed sequentially or in parallel (for example, using a parallel processor or a multi-threaded environment).

This specification is described according to flowcharts and/or block diagrams of the method, the device (system), and the computer program product according to the embodiments of this specification. It should be understood that each process and/or block in the flowcharts and/or block diagrams, and a combination of the process and/or the block in the flowcharts and/or block diagrams can be realized by computer program instructions. These computer program instructions may be provided to a processor of a general-purpose computer, a special-purpose computer, an embedded processing machine, or other programmable data processing devices to generate a machine, so that execution of the instructions by the processor of the computer or other programmable data processing devices generates an apparatus for implementing functions specified in one or more processes of the flowcharts and/or one or more blocks of the block diagrams.

These computer program instructions may also be stored in a computer-readable storage that can direct a computer or other programmable data processing devices to operate in a specific manner, so that the instructions stored in the computer-readable storage produce a product including an instruction apparatus. The instruction apparatus implements the functions specified in one or more processes of the flowchart and/or one or more blocks of the block diagram.

These computer program instructions may also be loaded onto a computer or other programmable data processing devices, so that a series of operating steps are performed on the computer or other programmable devices to generate a computer-implemented process, and the instructions executed on the computer or other programmable devices provide steps for implementing the functions specified in one or more processes of the flowchart and/or one or more blocks of the block diagram.

In a typical configuration, a computing device includes one or more processors (CPU), an input/output interface, a network interfaces, and a memory.

The memory may include forms such as a volatile memory in a computer-readable medium, a random access memory (RAM), and/or a non-volatile memory, for example, a read only memory (ROM) or a flash memory (flash RAM). The memory is an example of the computer-readable medium.

The computer-readable medium includes both permanent and non-permanent, removable and non-removable media, and information storage may be implemented by using any method or technology. The information may be computer-readable instructions, a data structure, a module of a program, or other data. An example of the computer storage medium includes, but is not limited to, a phase-change memory (PRAM), a static random access memory (SRAM), a dynamic random access memory (DRAM), other types of random access memory (RAM), a read-only memory (ROM), an electrically erasable programmable read-only memory (EEPROM), a flash memory or other memory technologies, a compact disc read-only memory (CD-ROM), a digital versatile disc (DVD) or other optical storage, a magnetic tape cassette, a magnetic disk storage or other magnetic storage devices, or any other non-transmission media that may be configured to store information accessible by a computing device. As defined herein, the computer-readable medium does not include transitory computer-readable media, such as a modulated data signal and a carrier.

It should also be noted that the terms "include". "comprise", and any other variants mean to cover the non-exclusive inclusion. Thereby, the process, method, or device that includes a series of elements not only include those elements, but also include other elements not clearly listed, or include the inherent elements of the process, method, and device. Unless otherwise specified, an element limited by "include a/an . . . " does not exclude other same elements existing in the process, the method, or the device that includes the element.

Those skilled in the art should understand that the embodiments of this specification may be provided as a method, a system, or a computer program product. Therefore, this specification may take the form of a complete hardware embodiment, a complete software embodiment, or an embodiment combining software and hardware. Moreover, this specification may be in the form of a computer program product implemented on one or more computer-usable storage media (including, but not limited to, a disk storage, a CD-ROM, an optical storage, and the like) containing computer-usable program code therein.

This specification may be described in a general context of computer-executable instructions executed by a computer, for example, a program module. Generally, the program module includes a routine, a program, an object, an assembly, a data structure, and the like that perform a particular task or implement a particular abstract data type. This specification may also be practiced in distributed computing environments. In these distributed computing environments, a task is performed by a remote processing device connected by a communication network. In the distributed computing environment, the program module may be located in local and remote computer storage media including a storage device.

Each embodiment in this specification is described in a progressive manner, and same and similar parts between the various embodiments may be referred to each other. Each embodiment focuses on a difference from other embodiments. In particular, for a system embodiment, since the system embodiment is basically similar to the method embodiment, the description is relatively simple. For related parts, refer to the partial description of the method embodiment.

The descriptions are merely embodiments of this specification, and are not intended to limit this specification. For a person skilled in the art, various modifications and changes may be made to this specification. Any modifications, equivalent replacements, and improvements made within the spirit and principle of this specification shall fall within the scope of the claims of this specification.

What is claimed is:

1. A map creating method for an autonomous robot, comprising:
   acquiring an initial map selected from an external database, wherein the initial map comprises an initial boundary;
   in response to acquiring the initial map, causing the autonomous robot to perform boundary detection to acquire a measured boundary, wherein causing the autonomous robot to perform the boundary detection to acquire the measured boundary comprises:
   causing the autonomous robot to move near the initial boundary,
   performing, by a boundary detection sensor of the autonomous robot, the boundary detection on the initial boundary, and
   acquiring, by a positioning sensor of the autonomous robot, the measured boundary during a boundary detection process, wherein a positioning precision of the positioning sensor satisfies a preset condition; and
   correcting the initial boundary according to the measured boundary.

2. The map creating method according to claim 1, wherein acquiring the initial map selected from the external database comprises:
   sending, to a server, a plot selection request carrying plot identification information; and
   receiving a plot selection response carrying a plot map, and using the plot map as the initial map, wherein the plot map is obtained by matching from a plot database by the server according to the plot identification information.

3. The map creating method according to claim 1, wherein acquiring the initial map selected from the external database comprises:
   receiving the initial map sent by a third party, wherein the initial map is selected from the plot database or an electronic map by the third party.

4. The map creating method according to claim 1, wherein the causing the autonomous robot to perform boundary detection comprises:
   determining, according to detection data collected by a boundary detection apparatus of the autonomous robot, whether a boundary point is detected;
   recording a heading angle of the autonomous robot and first coordinates outputted by a positioning apparatus of the autonomous robot at a time when the boundary point is detected;
   determining second coordinates of the boundary point according to the first coordinates, the heading angle, a distance between the positioning apparatus and the boundary detection apparatus, and the detection data; and
   forming the measured boundary according to respective second coordinates of each detected boundary point.

5. The map creating method according to claim 1, further comprising:
   causing the autonomous robot to maintain a preset safe distance from the initial boundary in a process of causing the autonomous robot to perform the boundary detection; wherein causing the autonomous robot to maintain the preset safe distance from the initial boundary comprises: causing the autonomous robot to maintain a first safe distance from a dangerous boundary segment in the initial boundary; and
   causing the autonomous robot to maintain a second safe distance from a non-dangerous boundary segment in the initial boundary, wherein the second safe distance is less than the first safe distance.

6. The map creating method according to claim 5, further comprising:

determining, in the process of causing the autonomous robot to perform the boundary detection, whether a to-be-detected boundary segment is the dangerous boundary segment;

determining whether a detection site is equipped with manual monitoring when the to-be-detected boundary segment is the dangerous boundary segment; and causing the autonomous robot to start or continue the boundary detection in response to determining that the detection site is equipped with the manual monitoring; and stopping the autonomous robot in response to determining that the detection site is not equipped with the manual monitoring.

7. The map creating method according to claim 6, wherein determining whether the detection site is equipped with the manual monitoring comprises any one or more of:

determining, based on whether a wireless communication module of the autonomous robot receives a wireless signal transmitted by a specified device, whether the detection site is equipped with the manual monitoring, wherein the specified device is carried by an on-site monitoring personnel; or determining, based on whether an imaging detector of the autonomous robot detects a human body signal within a specified detection radius, whether the detection site is equipped with the manual monitoring.

8. The map creating method according to claim 1, wherein correcting the initial boundary according to the measured boundary comprises:

replacing the initial boundary with the measured boundary.

9. An autonomous robot, comprising:
a control apparatus configured to:
acquire an initial map selected from an external database, wherein the initial map comprises an initial boundary; and
control the autonomous robot to move near the initial boundary in response to obtaining the initial map;
a boundary detection sensor configured to perform boundary detection to acquire a measured boundary on the initial boundary; and
a positioning sensor configured to acquire the measured boundary during a boundary detection process, wherein a positioning precision of the positioning sensor satisfies a preset condition, and the control apparatus is further configured to correct the initial boundary according to the measured boundary.

10. The autonomous robot according to claim 9, wherein acquiring the initial map selected from the external database comprises:

sending, to a server, a plot selection request carrying plot identification information; and receiving a plot selection response carrying a plot map, and using the plot map as the initial map, wherein the plot map is obtained by matching from a plot database by the server according to the plot identification information.

11. The autonomous robot according to claim 9, wherein acquiring the initial map selected from the external database comprises:

receiving the initial map sent by a third party, wherein the initial map is selected from the plot database or an electronic map by the third party.

12. The autonomous robot according to claim 9, wherein performing the boundary detection comprises:

determining, according to detection data collected by a boundary detection apparatus of the autonomous robot, whether a boundary point is detected;

recording a heading angle of the autonomous robot and first coordinates outputted by a positioning apparatus of the autonomous robot at a time point when the boundary point is detected;

determining second coordinates of the boundary point according to the first coordinates, the heading angle, a distance between the positioning apparatus and the boundary detection apparatus, and the detection data; and forming the measured boundary according to respective second coordinates of each detected boundary point.

13. The autonomous robot according to claim 9, wherein the autonomous robot is further configured to:

maintain a preset safe distance from the initial boundary when the boundary detection is performed, wherein maintaining the preset safe distance from the initial boundary comprises:

causing the autonomous robot to maintain a first safe distance from a dangerous boundary segment in the initial boundary; and causing the autonomous robot to maintain a second safe distance from a non-dangerous boundary segment in the initial boundary, wherein the second safe distance is less than the first safe distance.

14. The autonomous robot according to claim 13, wherein the autonomous robot is further configured to:

determine, when the boundary detection is performed, whether a to-be-detected boundary segment is the dangerous boundary segment;

determine whether a detection site is equipped with manual monitoring when the to-be-detected boundary segment is the dangerous boundary segment;

cause the autonomous robot to start or continue the boundary detection in response to determining that the detection site is equipped with the manual monitoring; and stop the autonomous robot in response to determining that the detection site is not equipped with the manual monitoring.

15. The autonomous robot according to claim 14, wherein determining whether the detection site is equipped with the manual monitoring comprises any one or more of:

determining, based on whether a wireless communication module of the autonomous robot receives a wireless signal transmitted by a specified device, whether the detection site is equipped with the manual monitoring, wherein the specified device is carried by an on-site monitoring personnel; or determining, based on whether an imaging detector of the autonomous robot detects a human body signal within a specified detection radius, whether the detection site is equipped with the manual monitoring.

16. The autonomous robot according to claim 9, wherein correcting the initial boundary according to the measured boundary comprises:

replacing the initial boundary with the measured boundary.

17. A non-transitory computer storage medium storing a computer program thereon, wherein the computer program, when executed by a processor, performs the map creating method of claim 1.

* * * * *